June 23, 1953     O. J. POUPITCH     2,642,593
METHOD AND MACHINE FOR ASSEMBLING WASHERS WITH FASTENERS
Filed Dec. 11, 1948     3 Sheets-Sheet 1
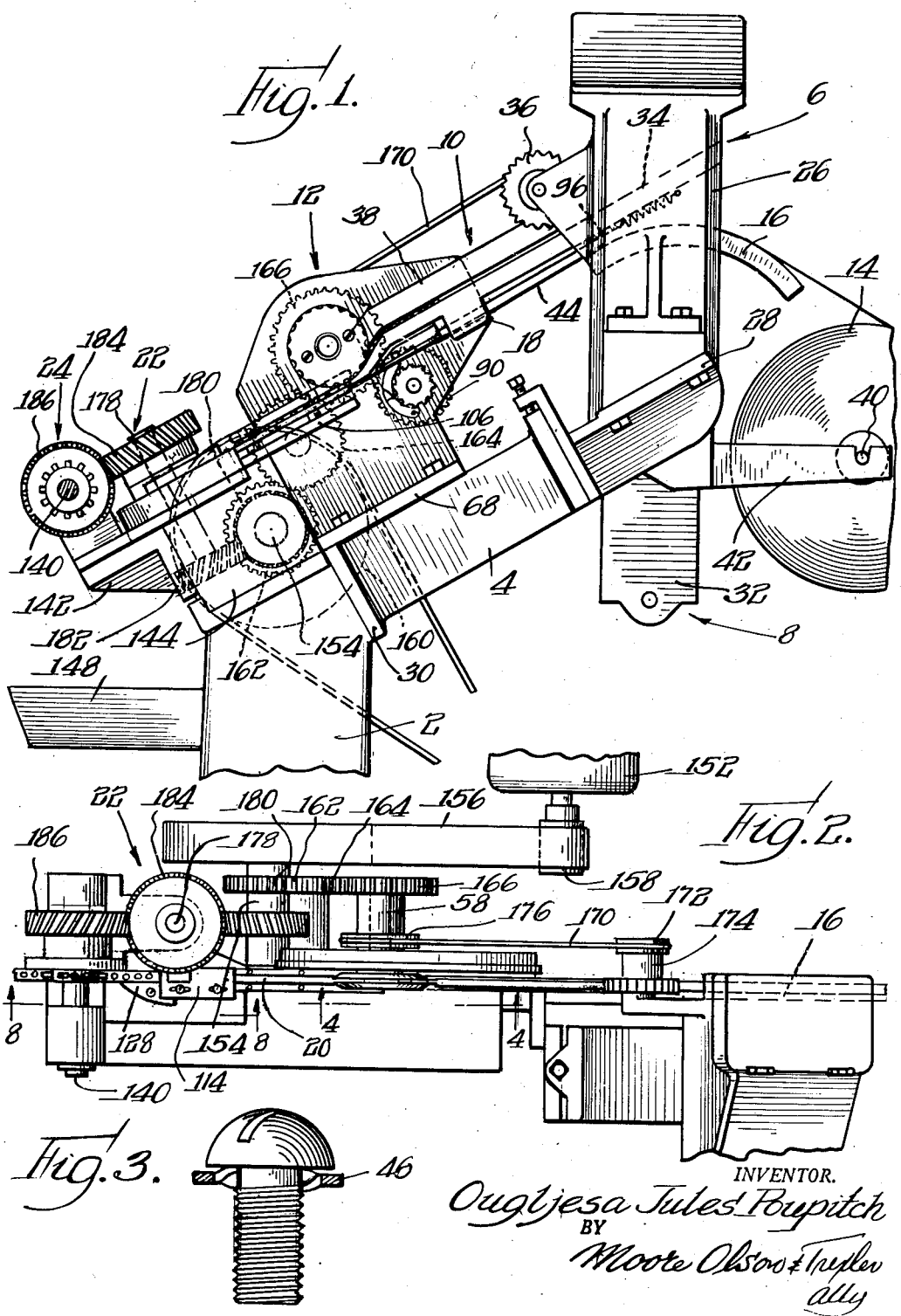
INVENTOR.
Ougljesa Jules Poupitch
BY
Moore Olson & Trexler
Atty June 23, 1953          O. J. POUPITCH          2,642,593
METHOD AND MACHINE FOR ASSEMBLING WASHERS WITH FASTENERS
Filed Dec. 11, 1948          3 Sheets-Sheet 2
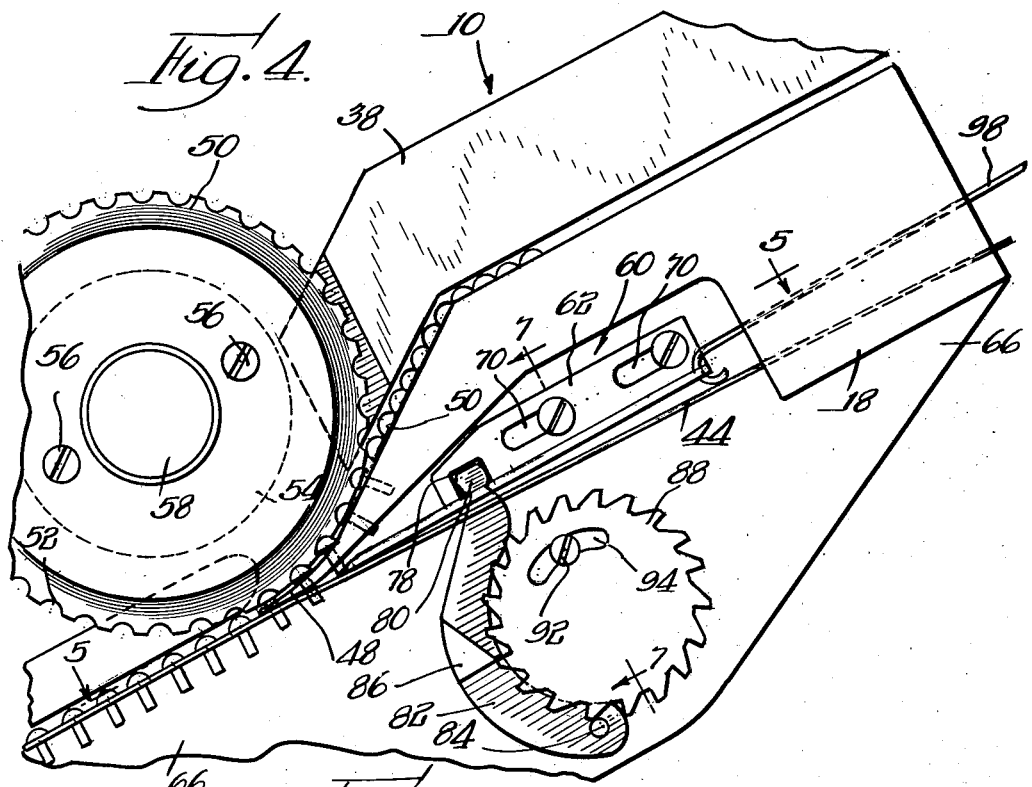
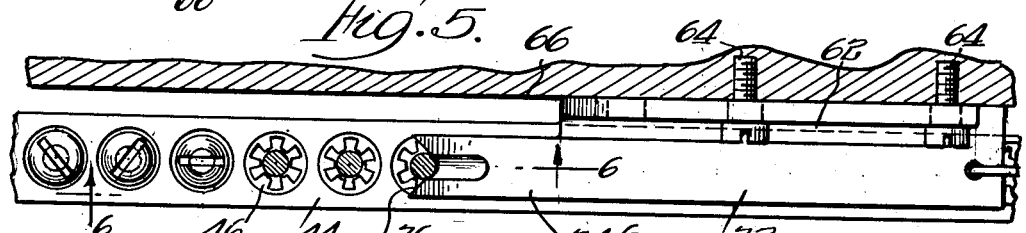
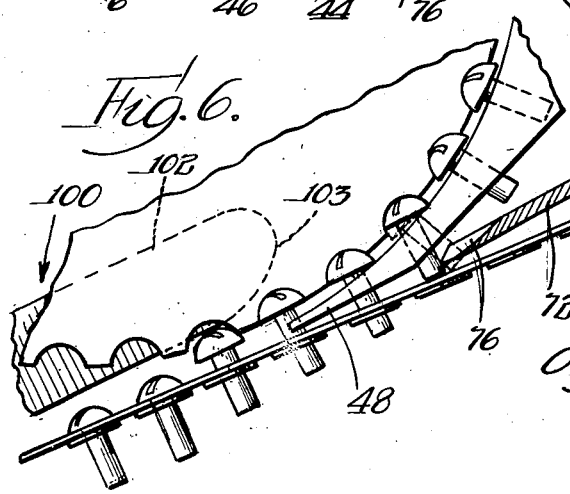
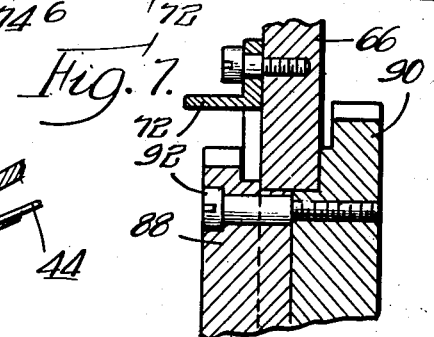
INVENTOR.
Ougljesa Jules Poupitch
BY
Moore, Olson & Trexler
attys.

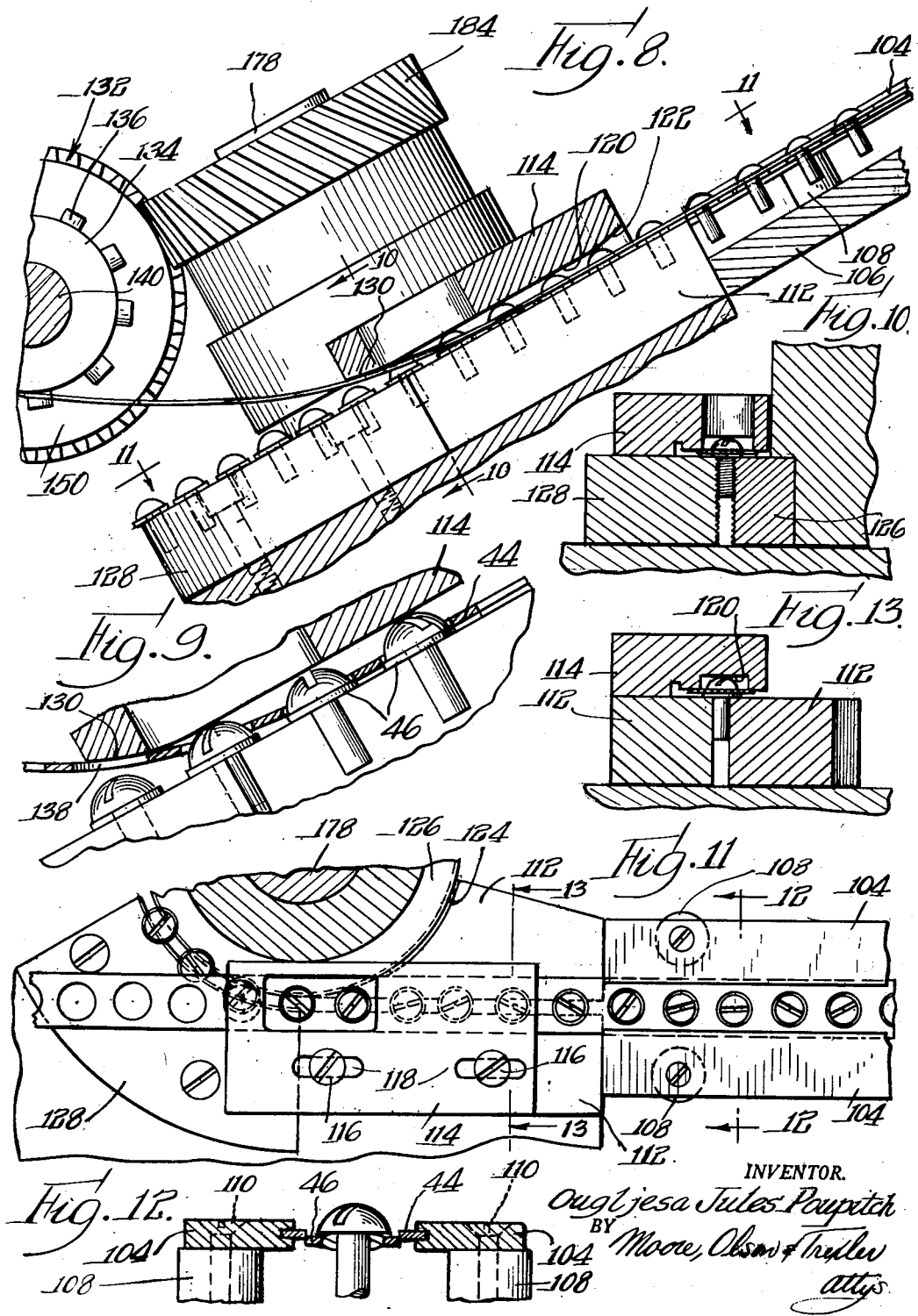

Patented June 23, 1953

2,642,593

UNITED STATES PATENT OFFICE 2,642,593

METHOD AND MACHINE FOR ASSEMBLING WASHERS WITH FASTENERS

Ougljesa Jules Poupitch, Chicago, Ill., assignor to Illinois Tool Works, Chicago, Ill., a corporation of Illinois Application December 11, 1948, Serial No. 64,875

15 Claims. (Cl. 10—2)

1

This invention relates to a method and machine for producing, as an article of manufacture, a unit assembly of a threaded fastener and a washer, particularly a screw and lock washer.

Prior machines for manufacturing screw and washer units have been limited in capacity by reason of the use of intermittently operated mechanisms for feeding the screw elements, for feeding the washer elements, for assembling the screws and washers, and for operating the thread rolling mechanism.

It is accordingly an object of this invention to provide a method, machine or mechanism for assembling screws and washers or like fasteners at a continuous, uniform rate or speed, and at a much higher rate of production than heretofore accomplished.

One of the major difficulties which has heretofore limited efforts to increase the production rate of assembled screw and washer units, has been the difficulty of feeding washers, particularly lock washers, individually and properly oriented at the necessary speed.

The manufacture of washers in strip form has made it possible to assure a greater uniformity in respect to the orientation of the washers at the assembly position. Such mechanisms, as disclosed in my prior Patent 2,390,121, and in Nielsen Patent 2,284,676, although effectively utilizing that possibility inherent in the use of washers in strip form, are restricted as to the maximum rate at which they can feed washers by reason of the intermittent nature of the mechanism for feeding the strip of washers to the assembly position.

It is therefore an object of this invention to provide continuously operated means for feeding a strip of washers past an assembly position or location at which screws are inserted into, or meshed with, the washers of the strip and then to a continuously operated screw shank enlarging or thread rolling mechanism whereby the rate of production of screw and washer units may be greatly increased.

Another object of the present invention is to provide in a screw and washer machine of the type in which the washers are fed in strip form to an assembly mechanism or station, means including a shank enlarging or thread rolling mechanism for detaching the washers of temporarily assembled units from the strip.

The present invention contemplates the provision of a method and machine by means of which screw blanks are assembled with a continuously moving strip of washers and the strip

2 of washers with the screw blanks assembled therewith carried to a shank enlarging or thread rolling mechanism, the strip being conveyed along one path while the assembled screws and washers are deflected from the strip and are brought, still partially attached to the strip, to the shank enlarging or thread rolling mechanism and by that mechanism detached from the strip, and the shank enlarged or a thread rolled or extruded permanently to retain the washers on the screws.

The manufacture of assembled screw and washer units in the smaller and smallest sizes has been impossible or impractical because of the frequent failure of the screw feeding means and the washer feeding means to deliver the screws and washers in properly oriented positions and alignment for assembly, because of the difficulty of maintaining them properly positioned while telescoping one with the other, and because of the difficulty of feeding those sizes of screws and washers after assembly to the shank enlarging or thread rolling mechanism.

An ancillary, highly important object of the present invention is accordingly to provide a method and machine for making assembled screw and washer units of the smaller sizes, and particularly units embodying the very smallest sizes of washers and the very short screws.

A more specific object of my invention is to provide a screw forming machine, preferably a continuously operated thread rolling machine, including means for continuously feeding at a constant rate a strip of washers from a roll past an assembly mechanism which inserts screw elements successively into the moving strip of washers, which is then carried by the strip feeding means, at said constant rate, to a shank enlarging or thread rolling mechanism which cooperates with suitable strip guiding and deflecting means and screw element guiding means to detach the assembled screws and washers from the strip without interfering with the continuous movement of the strip.

Other and further objects and advantages of the present invention will be apparent when taken in connection with the accompanying drawings wherein:

Fig. 1 is a fragmentary view in vertical elevation of a machine embodying the invention;

Fig. 2 is a fragmentary plan view of the machine of Fig. 1;

Fig. 3 is a vertical elevation of a screw blank and lock washer assembly produced by the machine of Figs. 1 and 2;

Fig. 4 is a fragmentary view in vertical section taken substantially along the line 4—4 of Fig. 2;

Fig. 5 is a fragmentary view in generally horizontal section taken along the line 5—5 of Fig. 4;

Fig. 6 is an enlarged fragmentary view of a portion of Fig. 4 to better illustrate the operation of the assembly mechanism;

Fig. 7 is a fragmentary view in generally vertical section taken along the line 7—7 of Fig. 4;

Fig. 8 is a fragmentary view in generally vertical section taken along the line 8—8 of Fig. 2;

Fig. 9 is an enlarged view of a portion of Fig. 8 illustrating the manner in which the assembled units are detached from the strip;

Fig. 10 is a fragmentary view in generally vertical section taken along the line 10—10 of Fig. 8;

Fig. 11 is a fragmentary view in generally horizontal section taken along the line 11—11 of Fig. 8;

Fig. 12 is a fragmentary view in generally vertical section taken along the line 12—12 of Fig. 11; and Fig. 13 is a fragmentary view in generally vertical section taken along the line 13—13 of Fig. 11.

As shown in the drawings, a screw forming or thread rolling machine which embodies the present invention may comprise a main base or pedestal 2, Fig. 1, an auxiliary base or body casting 4, a hopper 6 for severing a mass of screw blanks, and a screw blank feed mechanism 8 for discharging the blanks from the hopper 6 to a screw feeding chute 10. Screws are delivered by the chute 10 to the screw feeding wheel of an assembly mechanism 12. The washers are supplied in strip form from a roll 14 and are carried, over a guide means 16 and 18, past the assembly mechanism and then along a strip guiding channel or means 20 and to a combined thread rolling and washer detaching mechanism 22 from which the strip passes into feeding engagement with the strip feeding device or means 24.

As shown in Figs. 1 and 2, the hopper 6 and feed mechanism 8 for the screw blanks comprise a hopper casting 26 adjustably mounted in a conventional manner on a casting 28 in turn adjustably mounted on the rear end of the auxiliary body or casting 4, the casting 4 being mounted at its forward end as by suitable bolts on a side flange 30 of the main base or pedestal 2. Slidably mounted in guideways in the hopper casting 26 is a reciprocating plate 32 which as it moves upwardly picks up a mass of screw blanks from the hopper 6 and drops them on to the guide chute 10. The guide chute comprises spaced parallel bars 34 which extend into and are supported on the hopper casting in juxtaposition to the path of movement of the reciprocating plate 32. The chute bars 34 project forwardly therefrom at a suitable angle of inclination so that screw blanks which are properly seated with their shanks between the bars and their heads resting on the bars are fed by gravity from the hopper.

Mounted on the hopper casting in proximity to the chute bars 34 is the usual rotatable clearance wheel 36 which prevents washers not properly seated in and on the chute bars from passing out of the hopper.

The chute 10 also comprises, in addition to the chute bars 34, a cover bar 38 which extends from the clearance wheel centrally over the chute bars to confine the screw blanks in the chute, the cover bar being adjustably mounted in the usual manner (not shown) on one of the chute bars for vertical adjustment to accommodate screw blanks having different size heads. It is to be understood that the chute bars 34 are themselves adjustable toward and from each other in order to accommodate screw blanks of different shank diameters.

As previously indicated, the washer strip to be assembled with the screw blanks is supplied to the machine in the form of a roll 14, the roll being placed on a rod 40 detachably supported for free rotation on a bracket 42 formed integrally with and projecting rearwardly from the auxiliary body 4 or secured to the hopper mounting casting 28, as may be desired. A washer strip 44 which is supplied from the roll 14, as best seen in Figs. 5, 9 and 12, comprises a strip of material in which have been formed at equally spaced intervals, lock washers 46 each completely formed internally as by the usual washer stamping operations and formed externally by pressing the washer 46 below the plane of the strip material but not sufficiently to detach the washer from the strip so that each washer remains connected to the strip but readily severable therefrom. As shown in the drawings, the washers 46 are of the internal tooth type and the periphery or external margin of each washer is smooth and each washer is attached to the strip by a very thin peripheral circular section or line of joinder at the upper surface plane of the washer. It is to be understood, however, that the washers may be of the external tooth type in which case the inner margin or central aperture of the washer would be smooth surfaced and the external teeth, or some of them, would be joined, or remain attached, to the strip by very thin arcuate sections or lines of joinder.

The guide 16 comprises an arcuate bar suitably secured to one sidewall of the hopper casting 26 and the washer strip 44 passes from the roll 14 over this arcuate bar 16 and through the guide 18 which consists of depending projections of spaced chute bars 34, the depending projections having slots in their confronting faces to form guide channels for the washer strip 44.

The chute bars 34 are formed at their lower free ends with arcuate guide fingers 48 beneath which the washer strip 44 passes. The upper, screw head engaging surfaces of the guide fingers 48 merge into sharply inclined guide surfaces 50 which extend tangentially from the arcuate surfaces to the point of intersection with the less sharply inclined upper screw engaging guide surfaces of the main portion of the chute bars. The cover bar 38 of the chute extends over the sharply inclined surfaces 50 of the chute bars to hold the screws in this sharply inclined portion of the chute bars.

The assembly mechanism 12 comprises a pair of feed disks 50, one only of which is shown in the drawings, these disks having a plurality of equally spaced peripheral notches or semi-circular recesses 52. The disks 50 and a spacer disk of smaller diameter which is mounted between the disks, are secured to a driving collar 54 and a pair of bolts 56. The driving collar 54 is secured to a driving shaft 58 in any suitable manner. The lower end portion of the cover bar 38 of the chute 10 is reduced in thickness and passes into the space between the feed disks 50 so as to hold the screw blanks properly positioned in the sharply inclined portion of the chute as they gravitate into the peripheral recesses 52 of the continuously rotating feed disks 50.

As the assembly wheel rotates at a continuous uniform rate, each recess 52 as it approaches the arcuate surfaces of the feed chute fingers 48 picks up the head of the leading screw blank at approximately the point where the sharply inclined surfaces 50 of the chute merge into the arcuate surfaces of the feed chute and the wheel thereafter feeds the screw blanks, the heads of which are received in those recesses, at said uniform rate along the arcuate surfaces of the feed fingers. As the screws are fed along the arcuate surfaces of the feed chute fingers they assume various angular positions relative to the wheel and they therefore may not be sufficiently aligned with the washers of the strip passing between the chute feed fingers to project thereinto.

Accordingly, applicant provides screw aligning or centralizing means 60 for shifting the screw blanks to bring the shanks thereof into precise longitudinal and lateral alignment with the washer apertures so that as the washer strip is continuously fed the free end of the shank of each screw blank will be progressively projected more and more into a washer as the assembling wheel continues to rotate synchronously with the advancing washer strip. This aligning or centralizing means preferably comprises a reciprocating slide 62 slidably mounted on bolts 64, Fig. 5, threaded into a vertical flange or plate 66 of a bracket having a horizontal flange or plate 68 bolted to the auxiliary body casting 4. The bolts 64 are received in slots 70 in the vertical flange of the slide 62, the horizontal flange 72 of the slide being formed integrally at its forward end with an aligning or centralizing finger 74. The finger 74 is formed at its forward end with a V-shaped notch 76 for centralizing the shank of each screw blank laterally of the washer strip and with respect to the washer aperture. The vertical flange of the slide 62 is formed in its rear surface with a slot 78 to receive the knuckle 80 formed at the upper end of the lever 82 pivoted at its lower end, as by pin 84 to the plate 66, and provided intermediate its ends with a tooth or pawl 86. The lever 82 extends circumferentially above, and moves behind, a ratchet 88, the teeth of which engage and operate the tooth or pawl 86 to cause the lever to move in a counterclockwise direction. The ratchet 88 is adjustably secured to a driving gear 90, Fig. 7, as by a bolt 92 threaded into the driving gear and passing through an arcuate slot 94, Fig. 4, in the ratchet 88. The driving gear 90 and the ratchet 88 are provided with reduced hub portions, as shown in Fig. 7, journaled in the plate 66, and the ratchet is provided with a reduced portion between the toothed periphery and the outer face of the plate 66 to provide an annular space permitting inward and outward movement of the lever 82 radially of the ratchet.

The slide 62, and consequently the centralizing finger 74, is urged in a rearward direction, and the lever 82 urged in a clockwise direction, by a coil spring 96, Fig. 1, secured at one end to some fixed point of the machine, as for example the hopper casting, and secured at its other end to a long wire or rod 98 having at its forward end a hook received in an opening in the rear end of the slide 62.

The gear 90 is driven in timed relation with the movement of the washer strip and the movement of the assembly wheel so that the centralizing finger is moved forwardly into engagement with the free end of the shank of a screw blank just prior to the time that the free end reaches the plane of movement of the washer strip and the centralizing finger moving forwardly relative to the strip swings the shank of the screw blank forwardly, as seen in Fig. 6, so that it is precisely aligned with the washer aperture for meshing therewith as the assembly wheel continues to rotate in synchronism with the advance of the washer strip. This meshing of the screw shank with the washer occurs somewhat before the screw blank reaches the lower end of the arcuate feed fingers 48 and therefore the continued rotation of the assembly wheel carrying the screw blank down the feed finger causes further projection of the screw shank through the washer aperture. It should be observed that, as shown in Fig. 6, the arcuate feed fingers terminate substantially in a plane radial to the assembly wheel and normal to the strip.

Means are provided for insuring the movement of the screw blank out of the recess in the assembly wheel when the screw blank has left the arcuate feed fingers. This stripper or ejecting means 100 comprises a finger or lever 102 mounted in any suitable manner on plate 66 and formed at its rear free end with a curved or camming nose 103. The finger or lever extends between the disks 50 of the assembly wheel and is so adjusted that as each screw blank leaves the chute fingers 48 it engages the curved camming nose 103, consequently when the head of the screw passes from the chute fingers 48 it is cammed by the nose 103 out of the assembly wheel, the stripper or ejector finger applying a downward force on the head of the screw blank so that it will be further telescoped with the washer strip and prevented from adhering to the surface of the assembly wheel. If for any reason the screw shank should have become cocked with respect to the washer after the initial projection thereinto, then the camming nose 103 of the stripper finger will, by applying a downward pressure, and a frictional reardation to the head of the shank, straighten the shank of the screw in the washer and start it on its downward movement through the washer, which movement is of course normally completed by the action of gravity on the screw, once the screw shank being freed from the screw chute has its shank properly aligned with respect to the washer aperture.

The possibility of misalignment of the shanks of the screw blanks with the washer apertures increases with the increasing length of the screws. In assembling the shorter or extremely short screws, the assembly wheel and the arcuate feed fingers perfect a sufficiently precise alignment of the screw blanks with the washer apertures and therefore with the short or extremely short screws the centralizing means may be eliminated.

From the assembly mechanism the strip of washers, with the screw blanks assembled therewith, passes through a channel formed by spaced bars 104 having grooves in the confronting edges to form a guide and support for the strip. The bars 104 are spaced apart sufficiently to permit passage of the washers 46 while supporting the margins of the strip as shown in Fig. 12. The bars 104 are mounted in vertically spaced relation on a mounting bar or block 106 bolted to the plate 66, the bars being supported by spacing sleeves 108 on bolts 110 passing through the bars 104 and threaded into the mounting bar 106. The spacing sleeves 108 are of sufficient length that the shanks of the screw elements clear the bar 106. From the guiding and supporting channel bars 104 the strip of washers with the screw blanks assembled therewith pass onto guiding and supporting blocks 112 which are spaced apart sufficiently to permit passage of the screw blanks and yet support the washer strip by supporting the washers 46.

A block 114 is adjustably secured as by bolts 116 received in slots 118 in the block 114 to one of the blocks 112. The block 114 is provided in its lower surface with a guide channel for the washer strip, the upper surface 120 of the channel being so spaced from the surface of the blocks 112 as to closely overlie the heads of the screws and prevent the screws and washers with which they are assembled from raising from the surfaces of the supporting blocks 112. The inner or upper end of the block 114 is beveled as at 122 to provide a cam surface which if any screw has not by the time the strip reaches this block been fully seated in the associated washer so that the under surface of the clamping head of the screw rests in contact with the washer, the surface 122 acts as a cam forcing the screw downward to that fully seated position. The inner block 112 terminates at its forward end in an arcuate surface 124 lying in close juxtaposition to the periphery of a circular thread rolling die 126 while the outer block 112 at its forward end abuts a stationary arcuate thread rolling die 128. The block 114 is of reduced thickness at its forward end so as to extend over a portion of the rotating die 126 and the stationary die 128.

The arcuate channel formed between the spaced dies, in order to receive the shank of each screw blank, is at its entrance end aligned with the path of the screw shanks, i. e., with the screw shank and guide channel formed by the spaced blocks 112 so that the screws pass successively and directly into the thread rolling dies as the strip is passing through the guide channel in the block 114. The block 114 is at its forward end of reduced thickness and the under surface 130 of this forward reduced thickness portion of the block is preferably curved to form a guide for the strip.

The strip is fed from the roll 14 along the path, as previously described, by a continuously rotating feed device or means 132 which preferably comprises a wheel 134 having radially projecting angularly spaced projecting teeth 136, which are of a diameter or cross dimension such as to readily fit within openings 138 left in the strip by the removal or detachment of the washers 46 from the strip. In threading a new strip through the machine when the roll 14 has been fully utilized, a few of the washers at the leading end of the new strip will be manually punched from the strip so as to provide a suitable number of openings 138 extending from the toothed wheel 134 to a point approximating the entrance end of the thread rolling dies.

The toothed wheel 134 is secured to a horizontal continuously rotating shaft 140 held in a suitable boss provided by the upstanding flange of a bracket 142 bolted to the front of a block 144 which also supports the blocks 112 and the stationary thread rolling die 128, and also the front end of the bar 106. The diameter of the feed wheel 134 and its spacing from the guide surface 130 of the block 114 are such that the strip once bent over the guide surface 130 and engaged with the teeth of the feed wheel causes the strip to diverge from the path of the temporarily assembled screw and washer units at a point in advance of the entrance end of the thread rolling dies and while the screw is retained against upward movement by the surface 120 of the block 114 so that the detachment of the washers from the strip begins prior to the entrance of the screws into the thread rolling dies by reason of the divergence of the strip and continues, but is not completed, by the time the screw blank reaches the thread rolling dies. As each screw blank enters the thread rolling dies, the turning and pulling force supplied to the shank by the dies completes the detachment of the washer by a twisting and pulling action, and the head of each screw as the screw progresses along the arcuate die channel passes under the elevated end of the strip. The dies extrude a thread on the shank of each screw blank which is thereby made of an external diameter greater than the diameter of the washer and hence retains the washer on the screw, as shown in Fig. 3. The finished unit being projected from the dies by the rotation of the die 126 falls into a pan 148 mounted on the pedestal 2.

The feed wheel 134 is preferably mounted on the shaft 140 in abutting relation to a larger disk 150 also secured to the shaft, this disk serving as a guide for the strip. A similar disk may be mounted on the other side of the feed wheel so that lateral movement of the strip is limited to the spacing between the two disks, thereby assuring maintenance of the strip in feeding relation to the teeth of the feed wheel.

The driving mechanism for the machine may comprise a motor 152 mounted in a suitable support (not shown) and connected to the main driving shaft 154 by belt 156 driven by a pulley 158 on the motor shaft and driving a pulley 160 on the shaft 154. The shaft 154 may be mounted in suitable bearings or bushing carried by the block 144 or by brackets (not shown) secured to the block. The assembly wheel shaft 58 may be mounted in suitable bushings or bearings secured to the plate 66 and driven by the shaft 154 through a gear 162 secured to shaft 154, a gear 164 secured to an idler shaft suitably mounted on brackets secured to the plate 66, and a gear 166 mounted on the shaft 58. The ratchet wheel driving gear 90 may be driven by a gear 168 mounted on the shaft 58 and meshing with the gear 90. The clearance wheel 36 may be driven through a belt 170 passing about a pulley 172 secured to the shaft 174 on which the clearance wheel 36 is mounted, the belt 172 being driven by a pulley 176 on the shaft 58.

The rotating die 126 is secured to a drive shaft 178 which may be journaled in bushings or bearings secured to the bracket 142. The shaft 178 is driven from the shaft 154 by means of a worm gear 180 on the shaft 154 and a worm gear 182 on the lower end of the shaft 178. The rotating shaft 140 is driven from the shaft 178 by means of a worm gear 184 on the shaft 178 and a worm gear 186 on the shaft 140. The reciprocating plate 32 of the screw feed mechanism 8 may be driven in any convenient and suitable manner, either by its own independent motor (not shown), or by means of a suitable belt or gear connection (not shown) to the shaft 154.

It will be evident that driving connections between the shaft 154 and various mechanisms may take many different forms, the essential requirement being that the assembly wheel disks 50, and the feed wheel 134, be driven in synchronism because the screws must be fed into the washer apertures in accordance with the rate of movement of the washer strip. The aligning and centralizing slide 62 must also be driven in timed relation with the movement of the strip and therefore it is essential that its driven gear be driven in synchronism with, or in proper timed relation to, the assembly wheel and the strip feeding means. The clearance wheel, the screw feeding plate and the rotating die may be driven at any usual speed consistent with the supplying of the screws to the assembly wheel at a sufficient rate to insure a continuous supply of screw blanks and that the rotating die be driven at a speed consistent with the rate at which the temporarily assembled screws and washers are presented to the dies for rolling thereby.

It will be evident from the foregoing description that applicant has described a method and machine for manufacturing permanently assembled screws and washer units by a continuous process in which washers are supplied by a continuously moving strip and the screws supplied by a continuously rotating wheel which causes the shanks of the screw blanks successively to mesh in the washer apertures of the strip and the continuously moving strip then carries the temporarily assembled units still attached to the strip to a combined thread rolling and detaching or severing means which first further partially separates or detaches the washers from the strip by deflecting the strip out of the path in which the temporarily assembled units are confined in their movement with the strip and the detachment then completed by the action of the thread rolling dies on the shanks of the screw blanks of the temporarily assembled units, which dies, as the screw shanks are introduced into them, exert a twisting or pulling action thereon thereby completing the detachment of the temporarily assembled units from the strip and rolling or extruding a thread on the shank so as to retain the washers and screws in permanently assembled relation. The strip is then carried forward or ejected from the machine by the continuously operating feed wheel by which the strip is carried from the supply roll past the assembly mechanism and to the thread rolling and detaching means.

It will be apparent from the foregoing description that applicant has provided a method, machine or mechanism for assembling screws and washers or like fasteners at a continuous, uniform rate or speed, and at a much higher rate of production than heretofore accomplished; a continuously operated means for feeding a strip of washers past an assembly position or location at which screws are inserted into, or meshed with, the washers of the strip and then to a continuously operated screw shank enlarging or thread rolling mechanism whereby the rate of production of screw and washer units may be greatly increased; in a screw and washer machine of the type in which the washers are fed in strip form to an assembly mechanism or station, means including a shank enlarging or thread rolling mechanism for detaching the washers of temporarily assembled units from the strip.

For purposes of illustration specific forms of washers have been disclosed in the drawings, however, it should be understood that the term washers as used in the specification and claims is not limited to the above mentioned specific forms, but is employed in the broadest sense to include other sheet metal parts apertured to accommodate a rotary threaded fastener.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A method of making unit assemblies of a rotary fastener and washer, comprising continuously feeding at a uniform rate a strip of material with the washers integrally attached thereto in longitudinally spaced relation, assembling rotary fasteners with the washers of the strip as the strip is moving at said rate, subsequently confining the assembled washers and fasteners to movement along one path during the feeding of the strip at said rate, and directing the strip along a path diverging from the confined path of the assembled washers and fasteners whereby to sever the washers from the strip.

2. A method of making unit assemblies of a screw blank and washer, comprising continuously feeding at a uniform rate a strip of material with the washers attached thereto in longitudinally spaced relation, inserting screw blanks into the washers of the strip as the strip is moving at said rate, confining the assembled washers and screw blanks for movement along one path during the feeding of the strip at said rate, and directing the strip along a path diverging from the confined path of the screw blanks and washers whereby to detach the washers from the strip, and enlarging the shank of each screw blank beneath the washer temporarily assembled therewith, thereby permanently to retain the washer in assembled relation with the screw.

3. A method of making unit assemblies of a screw blank and washer, comprising continuously feeding at a uniform rate a strip of material with the washers attached thereto in longitudinally spaced relation, inserting screw blanks into the washers of the strip as the strip is moving at said rate, confining the assembled washers and screw blanks for movement along one path during the feeding of the strip at said rate, and directing the strip along a path diverging from the confined path of the screw blanks and washers whereby to detach the washers from the strip, and extruding a thread on the shank of each screw blank beneath the washer temporarily assembled therewith, thereby permanently to retain the washer on the screw.

4. In a machine for making unit assemblies of a washer with a fastener having a washer receiving portion, means for continuously feeding longitudinally a strip having the washers integrally attached thereto in longitudinally spaced relation, means for assembling the fasteners with the washers of the moving strip, means to which the washer strip is fed after assembly of the fasteners therewith for severing the washers from the moving strip, and means for driving said feeding means, said assembling means, and said severing means in proper timed relation.

5. In a machine for making unit assemblies of a washer and a fastener having a washer receiving portion, means for receiving a strip of material having the washers integrally attached thereto in longitudinally spaced relation, means for feeding the strip of washers from said receiving means continuously past an assembly location to a severing location, means for assembling the fasteners with the moving washers as the strip is moving past said assembly location, means at the severing location for severing each washer from the moving strip as the strip passes said severing location, and means for driving said feeding means, said assembling means, and said severing means in proper timed relation.

6. In a machine for making unit assemblies of a screw element and a washer, means including a rotatable assembly wheel for conveying screw elements along an arcuate path, the free ends of the shanks projecting from the wheel, means for continuously feeding a strip of washers geenrally tangential to the said arcuate path of the screw elements and in synchronism with the feeding of the screw elements by said wheel, and a reciprocably mounted member movable generally parallel to the path of movement of the strip, said reciprocably mounted member having a forwardly projecting screw engaging finger centralizing the shank of each screw element laterally and longitudinally of the strip to assure meshing the free end of the shank of each screw element in a washer aperture, and driving mechanism operatively connected to said assembly wheel, said strip feeding means and said reciprocably mounted member for driving said wheel and said strip feeding means in synchronous relation and operating said reciprocably mounted member in timed relation thereto.

7. A method of making unit assemblies of a threaded fastener and a washer comprising inserting the fasteners into washers integrally attached in longitudinally spaced relation to a moving strip of material, then directing the strip and assembled fasteners and washers along diverging paths to sever the connections of the washers to the strip, and enlarging a portion of each fastener to retain the washer permanently on the fastener.

8. In a machine for making unit assemblies of a screw element and a washer, means for feeding along a predetermined path a strip of washers with the screw elements temporarily assembled therewith, and screw element enlarging means positioned to engage the screw elements carried along said path by the feeding of the strip, said screw element enlarging means including means for moving the engaged screw element and the washer assembled therewith along a path diverging from said predetermined path of movement of the strip whereby to detach the assembled screw elements and washers from the strip.

9. In a machine for making unit assemblies of a screw element and a washer, means for feeding along a predetermined path a strip of washers with the screw elements temporarily assembled therewith, and thread rolling mechanism positioned to engage the screw elements carried along said path by the feeding of the strip, said thread rolling mechanism including means for moving the engaged screw elements and the washers assembled therewith along a path diverging from the said predetermined path of movement of the strip whereby to detach the assembled screw elements and washers from the strip.

10. In a machine for making unit assemblies of a screw element and a washer, means for feeding along a predetermined path a strip of washers with the screw elements assembled therewith, and a rotating thread rolling die and a cooperating stationary arcuate die positioned to engage the screw elements carried along said path by the feeding of the strip, said rotating thread rolling die and cooperating stationary arcuate die including means for moving the engaged screw elements and the washers assembled therewith along a path diverging from the said predetermined path of movement of the strip whereby to detach the assembled screw elements and washers from the strip.

11. A machine for making unit assemblies of a washer and a fastener having a washer receiving portion, comprising means for feeding longitudinally at a continuous uniform rate a strip of integrally attached washers, means for inserting the fasteners into the moving washers while the strip is moving at said uniform rate to assemble the fasteners with the washers, means to which the washer strip is fed after assembly of the fasteners therewith for fracturing the connections integrally attaching the washers in the strip while the strip is moving, and means for driving said feeding means, said inserting means and said fracturing means in proper time relation.

12. In a machine for making unit assemblies of a fastener having a shank portion and a washer, means for conveying the fasteners along an arcuate path with the free ends of the shank portions projecting radially of said arcuate path, means for feeding at a constant uniform rate a strip of washers generally tangentially to the arcuate path of the fasteners, a shiftably mounted member having a free end portion to engage the shank portion of each fastener element during shifting of said member, said member being mounted to centralize the shank portion of each fastener element laterally and longitudinally of the strip to assure meshing of the free end of the shank portion of each fastener in a washer aperture, and driving mechanism operatively connected to said fastener conveying means, said strip feeding means and said shiftably mounted member for driving said conveying means, said strip feeding means and said shiftably mounted member in proper time relation.

13. A machine for making unit assemblies of a fastener and a washer, comprising means feeding longitudinally at a constant uniform rate a strip of integrally attached washers, means for feeding at the same rate fasteners into meshing relation with the washers, means to which the strip is fed after assembly of the fasteners with the washers of the strip for severing the attaching connections of the washers to detach the assembled units from the strip of washers, and means for driving said strip feeding means and said fastener feeding means in synchronism and said severing means in proper time relation to said strip feeding means.

14. In a machine for making unit assemblies of a washer and a fastener having a washer receiving portion, means for feeding at a constant uniform rate a strip of integrally attached washers, means for feeding at the same rate fasteners having washer receiving portions into meshing relation with the washers of the moving strip to telescope the washers with the washer receiving portions of the fasteners, and means positioned in the path of the moving strip to break the attaching connections of the washers after telescoping of the washers and fasteners to detach the assembled units from the strip, means for driving said strip feeding means and said fastener feeding means in synchronism and said connection breaking means in proper time relation to the moving strip.

15. In a machine for making unit assemblies of a washer and a fastener having a washer receiving portion, means for continuously feeding a strip of washers along a predetermined path at a uniform rate, means for conveying the fasteners along an arcuate path generally tangential to the path of the strip for meshing the fasteners with the moving washers, a severing device to which the strip is fed after meshing of the fasteners with the washers for severing the washers from the strip and means for driving said feeding means, said conveying means and said severing device in proper timed relation.

OUGLJESA JULES POUPITCH.

References Cited in the file of this patent

UNITED STATES PATENTS

| Number | Name | Date |
|---|---|---|
| 1,400,002 | Roger | Dec. 13, 1921 |
| 2,284,676 | Nielsen | June 2, 1942 |
| 2,284,698 | Trotter | June 2, 1942 |